United States Patent [19]

Hashimoto

[11] Patent Number: 4,630,073

[45] Date of Patent: Dec. 16, 1986

[54] THERMAL HEAD

[75] Inventor: Kenichiro Hashimoto, Kawasaki, Japan

[73] Assignee: Canon Kabushiki Kaisha, Tokyo, Japan

[21] Appl. No.: 628,275

[22] Filed: Jul. 6, 1984

[30] Foreign Application Priority Data

Jul. 14, 1983 [JP] Japan ................................ 58-126901

[51] Int. Cl.[4] ................................................ G01D 10/15

[52] U.S. Cl. ........................... 346/76 PH; 346/139 C; 219/543; 400/120

[58] Field of Search ............ 346/76 PH, 76 R, 139 C; 219/216 PH, 543; 400/120; 338/308

[56] References Cited

U.S. PATENT DOCUMENTS

| | | | |
|---|---|---|---|
| 3,340,381 | 9/1967 | Best | 346/76 PH |
| 3,955,068 | 5/1976 | Shaheen | 346/76 PH |
| 4,173,273 | 11/1979 | Hanakata | 346/76 PH |
| 4,194,108 | 3/1980 | Nakajima et al. | 346/76 PH |
| 4,203,025 | 5/1980 | Nakatani et al. | 219/216 PH |

*Primary Examiner*—Arthur G. Evans
*Attorney, Agent, or Firm*—Fitzpatrick, Cella, Harper & Scinto

[57] ABSTRACT

A thermal head has one or more slits formed at a portion of a substrate and one or more heat generating resistors arranged between the slits.

6 Claims, 15 Drawing Figures

THERMAL HEAD

BACKGROUND OF THE INVENTION

1. Field of the Invention

The present invention relates to a thermal head.

2. Description of the Prior Art

In a prior art thermal head, as shown in FIGS. 1A and 1B, a heat insulation layer 2 is formed on a ceramic substrate 1, and a heat generating resistor 3, an electrode layer 4 and a protection layer 5 are stacked thereon.

With this structure, however, a surface of the thermal head is flat and good contact between a heat generating area and a thermal record paper is not attained, and hence a high quality of print is not achieved. To avoid the above problem, a heat insulation layer 6 is formed only at the heat generating area as shown in FIGS. 2A and 2B so that the heat generating resistor 3 protrudes from the surface of the thermal head to attain good contact between the heat generating area and the thermal record paper.

However, in the above structure, because a plurality of heat generating resistors are fixed on one plane, some of the heat generating resistors make good contact to the thermal record paper while others do not, depending on the unevenness of the surface of the thermal record paper. As a result, print density is not uniform.

In a thermal transfer printer in which a thermal transfer ribbon is placed between the thermal head and a plane paper, non-uniformity in print density is a serious problem because of a requirement for a high print quality.

SUMMARY OF THE INVENTION

It is an object of the present invention to provide a thermal head in which each heat generating resistor independently contacts a record paper to prevent non-uniformity in the print density due to unevenness of the surface of the record paper.

BRIEF DESCRIPTION OF THE DRAWINGS

FIGS. 1 and 2 show examples of prior art thermal heads, in which FIGS. 3 to 7 show embodiments of the present invention in which;

DETAILED DESCRIPTION OF THE PREFERRED EMBODIMENTS

Figure 1A:
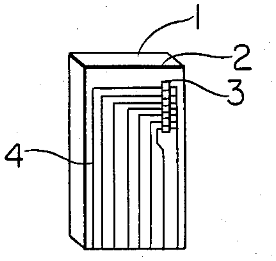
FIG. 1A PRIOR ART
FIG. 1A is a perspective view of one example.
Figure 1B:
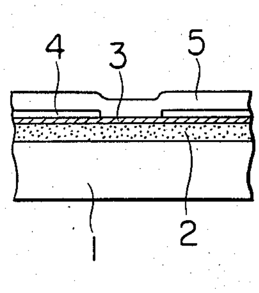
FIG. 1B PRIOR ART
FIG. 1B is a sectional view thereof.
Figure 2A:
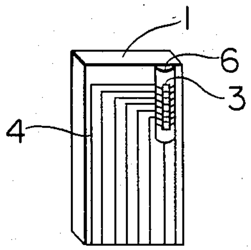
FIG. 2A PRIOR ART
FIG. 2A is a perspective view of another example and FIG. 2B is a sectional view thereof.
Figure 2B:
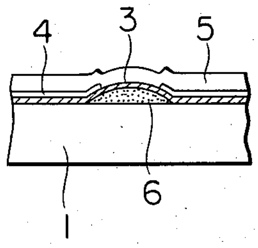
FIG. 2B PRIOR ART
Figure 3A:
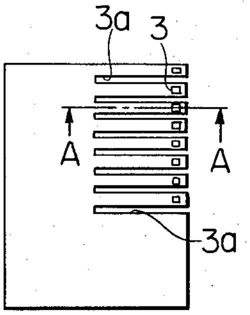
FIG. 3A is a plan view of a first embodiment.
Figure 3B:
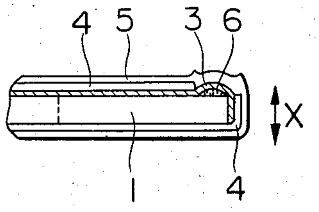
FIG. 3B is a sectional view taken along a line A—A.

Referring to FIGS. 3A and 3B, comb shaped slits 3A are formed in a ceramic substrate 1. Free ends of the teeth of the comb can make small resilient motion thicknesswise of the substrate as shown by an arrow X. A heat insulation layer 6, a heat generating resistor 3, an electrode layer 4 and a protection layer 5 are stacked at the free end of each tooth of the comb to form a heat generating area.

Figure 5A:
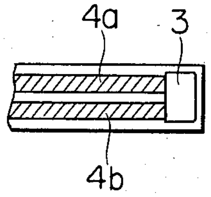
FIGS. 5A, 5B and 5C show different examples of wiring.
Figure 5B:
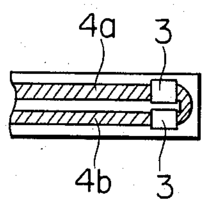
Figure 5C:
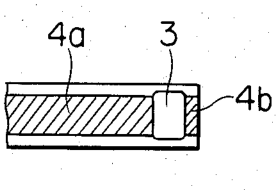

FIGS. 5A, 5B and 5C show examples of wiring of the electrodes. In FIGS. 5A and 5B, a signal line 4*b* and a common line 4*a* are arranged on a front side, and in FIG. 5C, the common line 4*a* and the signal line 4*b* are arranged on front and rear sides respectively.

With this structure, even if the surface of the record paper is not even, each heat generating area can move in a resilient motion independently in accordance with the unevenness of the surface of the record paper so that all heat generating areas can fully contact to the record paper and the ununiformity in the print density is avoided.

Figure 4A:
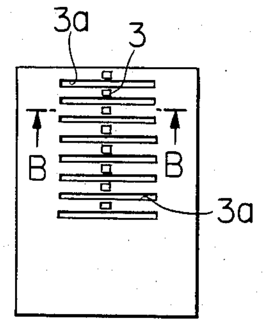
FIG. 4A is a plan view of a second embodiment.
Figure 4B:
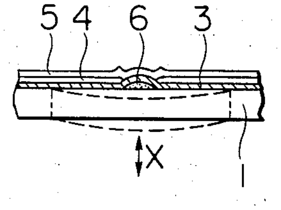
FIG. 4B is a sectional view taken along a line B—B.

In FIGS. 4A and 4B, the slits 3*a* are of slot shape instead of the comb shape. Like the embodiment of FIG. 3, the heat generating areas can move in a resilient motion thicknesswise as shown by an arrow X.

Figure 6A:
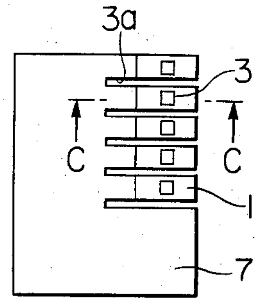
FIG. 6A is a plan view of a third embodiment.
Figure 6B:
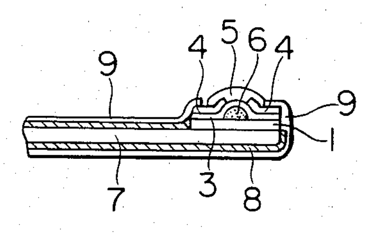
FIG. 6B is a sectional view taken along a line C—C.

In FIGS. 6A, 6B, 7A and 7B, the ceramic substrate 1 is mounted on a resilient substrate 7. Referring to FIGS. 6A and 6B, the resilient substrate 7 such as metal has a plurality of slits 3*a* similar to those of the ceramic substrate 1 of FIG. 5. They are of comb shape and the free ends thereof can move in a resilient motion.

The ceramic substrate 1 having the heat generating area is attached to the end of the substrate 7 and the electrode layer 4 is connected to a lead wire 9. Numeral 8 denotes an insulation layer used when the resilient substrate 7 is a conductor.

Figure 7A:
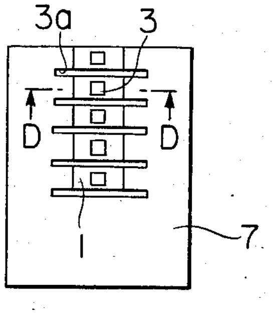
FIG. 7A is a plan view of a fourth embodiment.
Figure 7B:
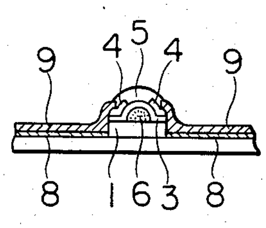
FIG. 7B is a sectional view taken along a line D—D.

In FIGS. 7A and 7B, the slits 3*a* are of slot shape instead of the comb shape. The same effect as that in FIG. 6 is attained.

In those embodiments, the heat generating members individually follow the unevenness of the surface of the record paper and hence non-uniformity in print density is avoided.

In the embodiments of FIGS. 3A, 3B, 4A and 4B, the substrate 1 need not be of ceramic material but any insulating material on which the heat generating resistor can be formed. A better effect is obtained if it is resilient.

The number of slits formed in the substrate is not restrictive and at least one slit may be formed. More than one heat generating resistor may be arranged between the slits.

As described hereinabove, in accordance with the present invention, at least one slit is formed at a portion of the substrate and the heat generating resistors are arranged between the slits. Accordingly, even if the surface of the record paper is uneven, the heat generating resistors follow the surface of the record paper by the resilient motion of the heat generating resistors, and the ununiformity in the print density is avoided and the high quality of print is attained.

What I claim is:

1. A thermal head comprising:

a resilient substrate having two major surfaces separated by the thickness of said substrate;

a plurality of elongated slits extending through said substrate from one major surface to the other; and heat generating resistive means on one of said major surfaces between said elongated slits for recording on a recording medium facing such major surface, whereby the material composition of said resilient substrate and the length of said elongated slits are such that the heat generating resistive means are supported by said resilient substrate for independent movement relative to each other.

2. A thermal head according to claim 1, wherein said heat generating resistive means comprises one or more heat generating resistors.

3. A thermal head according to claim 1, wherein said slits extend into said substrate from an edge thereof.

4. A thermal head comprising:

a resilient substrate having two major surfaces separated by the thickness of said substrate;

a plurality of elongated slits extending through said substrate from one major surface to another;

ceramic substrate means on one of said major surfaces of said resilient substrate between said elongated slits; and heat generating resistive means on said ceramic substrate means for recording on a recording medium facing such major surface, whereby the material composition of said resilient substrate and the length of said elongated slits are such that the heat generating resistive means are supported by said resilient substrate for independent movement relative to each other.

5. A thermal head according to claim 4, wherein said heat generating resistive means comprises one or more heat generating resistors.

6. A thermal head according to claim 4, wherein said slits extend into said resilient substrate from an edge thereof.

* * * * *